A. H. FETZER.
DRIVING MECHANISM FOR SWINGING AXLES.
APPLICATION FILED NOV. 30, 1907.
900,503.
Patented Oct. 6, 1908.
2 SHEETS—SHEET 1.
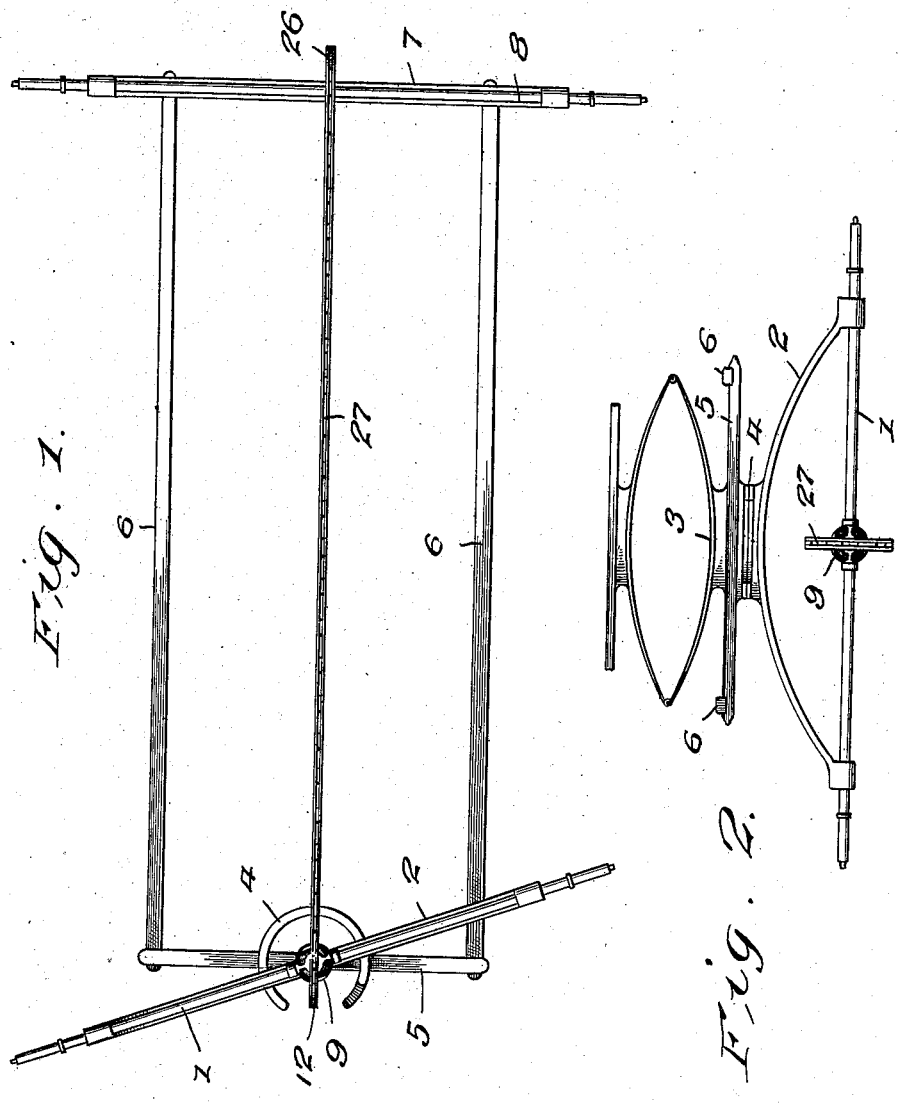

A. H. FETZER.
DRIVING MECHANISM FOR SWINGING AXLES.
APPLICATION FILED NOV. 30, 1907.
900,503.
Patented Oct. 6, 1908.
2 SHEETS—SHEET 2.
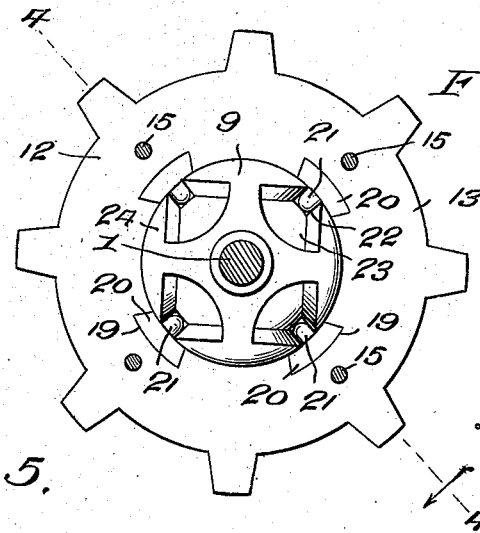
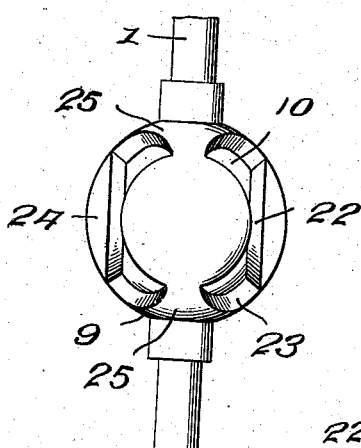
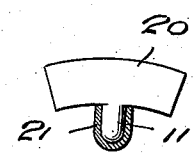
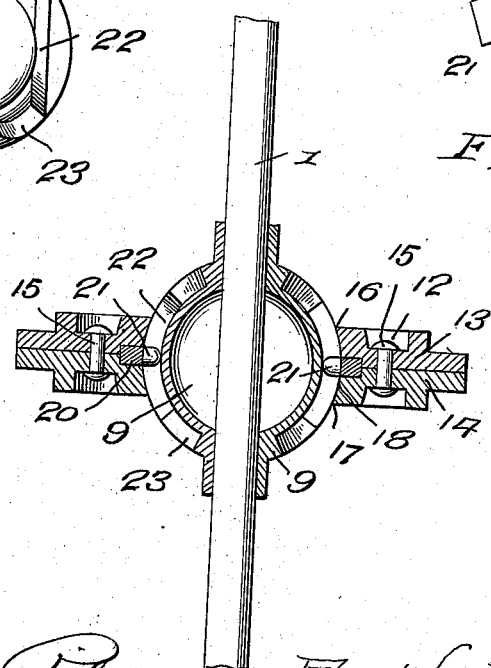
WITNESSES:
INVENTOR
A. H. Fetzer
BY
W. J. Fitzgerald & Co.
Attorneys

UNITED STATES PATENT OFFICE.

ALLEN H. FETZER, OF GALION, OHIO, ASSIGNOR OF ONE-EIGHTH TO GROVER M. SHUMAKER AND ONE-THIRD TO MELVIN E. SHUMAKER, OF GALION, OHIO.

DRIVING MECHANISM FOR SWINGING AXLES.

No. 900,503.  
Specification of Letters Patent.  
Patented Oct. 6, 1908.

Application filed November 30, 1907. Serial No. 404,478.

*To all whom it may concern:*

Be it known that I, ALLEN H. FETZER, a citizen of the United States, residing at Galion, in the county of Crawford and State of Ohio, have invented certain new and useful Improvements in Driving Mechanism for Swinging Axles; and I do hereby declare the following to be a full, clear, and exact description of the invention, such as will enable others skilled in the art to which it appertains to make and use the same.

My invention relates to guiding mechanism for swinging axles and more particularly to a ball and sprocket for driving the forward axle of a vehicle and my object is to provide a device of this class, whereby the axle may be swung to guide or turn the vehicle without affecting the position of the driving sprocket thereon.

A further object is to provide means for reducing the friction between the sprocket and the ball.

A still further object is to secure the anti-friction device to the sprocket and a still further object is to provide means for mounting the sprocket on the ball.

Other objects and advantages will be hereinafter referred to and more particularly pointed out in the claims.

In the accompanying drawings which are made a part of this application, Figure 1 is a bottom plan view of the vehicle-running gear, showing my improved device secured thereto. Fig. 2 is a front elevation of the running-gear. Fig. 3 is an elevation partly in section of the ball, showing one section of the sprocket removed. Fig. 4 is a sectional view through the ball and sprocket, as seen on line 4—4, Fig. 3. Fig. 5 is a plan view of the ball, and, Fig. 6 is an elevation partly in section of one of the anti-friction devices.

This invention is adapted more particularly to be used in connection with motor-driven vehicles and in order to drive both the rear and forward axles of the vehicle, the forward axle 1 is rotatably mounted in a frame 2, carried by the running-gear 3 of the vehicle and, in order to allow the axle to be swung to guide the vehicle, the usual or any preferred form of fifth wheel 4 is placed between the running gear 3 and frame 2.

A cross bar 5 is secured to the running gear 3 immediately above the fifth wheel 4, to the ends of which are secured bars 6, said bars extending to the rear frame 7 employed for carrying the rear axle 8 and said bars are adapted to support any preferred form of motor for propelling the vehicle.

Secured to the axle 1 and at its longitudinal center, is a ball 9, the face of which is provided with a plurality of cavities 10 and preferably four in number, in which are adapted to extend stems 11, carried by a sprocket 12, said sprocket being preferably formed in two sections 13 and 14, which are secured together in any preferred manner as by means of rivets, or the like, 15.

The sections 13 and 14 are provided with central openings 16 and 17, respectively, the walls of said openings being curved towards their inner edges to form a concave face 18, which face is adapted to fit the periphery of the ball 9, the width of the sprocket when the two sections are secured together, being such that the outer edges of the concave face will prevent casual removal of the ball from the sprocket.

The stems 11 are secured to the sprocket 12 by providing dove-tailed recesses 19 in the meeting faces of the sections 13 and 14, in which are seated heads 20, to which the stems 11 are secured and in order to reduce friction between the stems and the walls of the cavities 10, friction rollers 21 are introduced over said stems, the lower ends of said stems and the friction rollers being semi-circular.

In order to allow the ends of the axle 1 to be swung forwardly and rearwardly to guide the vehicle, the cavities 10 are disposed longitudinally of the axle 1 and the two side walls 22 of the cavities are convex, while the end walls 23 are concave, thereby forming circular disks 24 between the cavities 10 around the periphery of the ball, while the concave end walls form spiders 25 at the ends of the ball, the width of the cavities at their narrowest points being such as to snugly receive the stems and friction rollers thereon and allow the same to freely pass from end to end of the cavities. The rear axle 8 is also provided with a sprocket 26, around which and the sprocket 12, passes a driving chain 27, said chain in its passage between the sprockets, coöperating with the motor carried by the vehicle.

In placing the sprocket on the ball, the two sections are placed on the ball from opposite ends and are then secured together by means of rivets 15, the heads 20 carrying the stems 11, having previously been introduced into the recesses in one of the sections and it will be readily seen that when the sections of the sprocket have been secured together, said sprocket will be held in position on the ball until said sections are again separated. It will further be seen that the forward axle may be turned in either direction to guide the vehicle without changing the plane of the sprocket with respect to the chain employed for driving the same, said chain serving to hold the sprocket from lateral movement when the axle is turned and it will also be seen that the stems 11 will pivot around the disk 24 on the peripheral face of the ball when the axle is swung to guide the vehicle. It will further be seen that the forward axle will be positively driven regardless of the angle to which it may be turned in guiding the vehicle. It will further be seen that by providing a cup-like friction roller and forming the closed lower end thereof semicircular, said friction roller will travel over the bottom of the cavity 10 as well as against the side and end walls thereof with a minimum amount of friction.

What I claim is:

1. A mechanism of the character described, comprising an axle equipped with a ball having cavities in its periphery, the side walls of said cavities being convex and their end-walls being concave and a sectional sprocket whose sections are provided with central alining openings with their walls curved inwardly to conform to the periphery of said ball and means projecting from, and secured between said sprocket-sections, for engagement with said cavities.

2. A driving mechanism for swinging axles, comprising the combination with an axle; of a ball fixed to said axle, said ball having cavities around the periphery thereof, the side walls of said cavity being convex and the end walls concave; of a sprocket having an opening therein to receive said ball, the wall of said opening being concave and means on said sprocket adapted to enter said cavities and cause the sprocket to drive the ball and axle when power is applied to the sprocket.

3. A driving mechanism for axles, comprising the combination with an axle; of a ball fixed to said axle, said ball having cavities around the periphery thereof, the side walls of said cavities being convex and their end-walls being concave; a sprocket having an opening to receive said ball, the wall of said opening being concave and stems carried by the sprocket and adapted to enter said cavities on the ball and rotate the ball when power is applied to the sprocket.

4. A driving mechanism for axles, comprising the combination with an axle; of a ball fixed to said axle, said ball having cavities in its periphery, the side walls of said cavities being convex and their end walls being concave, a sprocket having an opening therein to receive the ball, stems depending from said sprocket and adapted to enter said cavities, means to removably secure the stems to the sprocket and friction rollers on said stems.

5. A driving mechanism of the class described, comprising a ball having cavities in its periphery; of a sprocket formed in two sections, said sections having openings therein to receive the ball, the walls of said openings being concave when assembled together, stems adapted to enter said cavities, heads on said stems, said sections having dove-tailed recesses to receive said heads and friction rollers on said stems.

6. A driving mechanism of the class described, comprising a ball having recesses therein, the side walls of which are convex and the end walls concave, a sprocket having an opening therein to receive the ball, the wall of said opening being concave, stems adapted to enter said cavity, heads on said stems, said sprocket having dove-tailed recesses to receive said heads and friction rollers on said stems.

In testimony whereof I have signed my name to this specification in the presence of subscribing witnesses.

ALLEN H. FETZER.

Witnesses:
CARL J. GUGLER,
BERTHA GREBE,
CHARLIE Q. SEIF.